United States Patent Office 3,448,212
Patented June 3, 1969

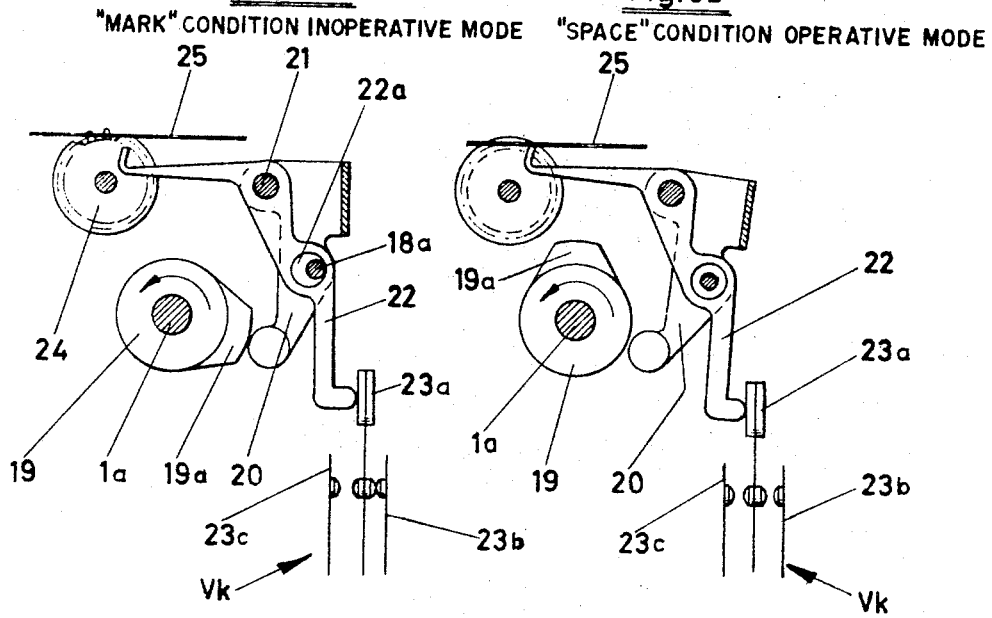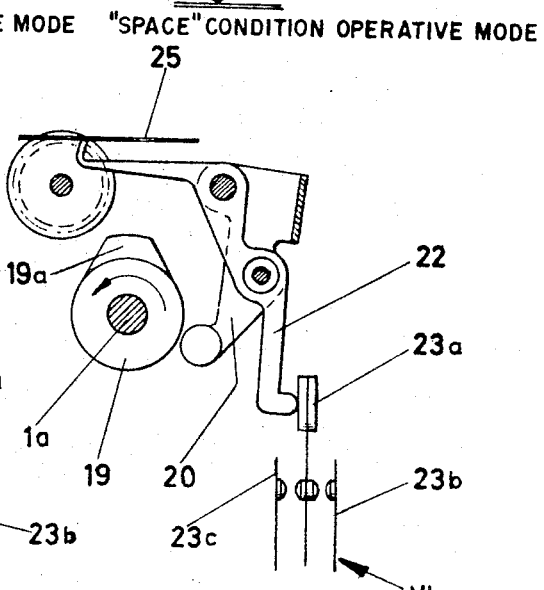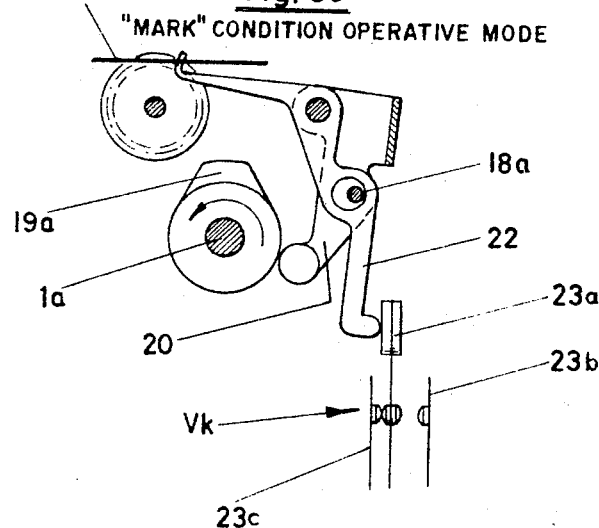

3,448,212
TELEPRINTER TAPE SENSING ATTACHMENT
Heinz Deimling, Singen, near Karlsruhe, Otto Holstein, Pforzheim, and Ernst Heger, Ispringen, near Pforzheim, Germany, assignors to International Standard Electric Corporation, New York, N.Y., a corporation of Delaware
Filed June 25, 1965, Ser. No. 466,920
Claims priority, application Germany, July 31, 1964, St 22,478
Int. Cl. H04l 15/18
U.S. Cl. 178—17         3 Claims

ABSTRACT OF THE DISCLOSURE

A teleprinter tape sensing attachment primarily for use with printing telegraphic apparatus employing transmitting equipment capable of being randomly switched over to key-board, answer-back or tape operation. In place of formerly employed mechanical setting and transmitting elements, are used switchover contacts for electrically influencing the transmitting equipment. The switchover contacts are governed by mechanical means which have as their mechanical power source the transmitting equipment drive shaft, through convenient attachment thereto of the sensing attachment drive shaft. The switchover contacts are connected in series with the transmitting equipment contacts through plug-in connectors, and through the attachment be in the inoperative mode, the potential at the transmitting contacts, required in the other operations, is supplied through the sensing attachment contacts.

---

The present invention relates to a tape sensing attachment comprising preparatory contacts for printing telegraph apparatus employing transmitting equipment capable of being randomly switched over to keyboard, answerback, or tape operation.

In view of the different requirements which are demanded from teleprinters with respect to their possible practical use, it is customary to provide additional accessories capable of being attached to the basic models, so that a teleprinter system can be individually adapted to the respective requirements in a cost-saving manner.

These additional accessories and attachments enable a perforated tape-controlled operation of the teleprinter system.

The requirement for a simple as possible mounting of these additional accessories made it necessary to provide such types of tape attachments with transmitting distributor facilities of their own, because the exposed position of the sensing device would enable a mechanical control of the already existing transmitter for the keyboard and answer-back operation only after constructional difficulties. Moreover, certain operating insecurities and difficulties arising from the subsequent installation are linked to these disadvantages which are also effected from the manufacturing-technical point of view.

In order to avoid these disadvantages, the present invention proposes a tape sensing attachment which, instead of a special transmitting facility or mechanical transmission elements, actuates preparatory contacts which are in an electrical connection with the contacts of the transmitting equipment. This reduces the necessary technical expenditure to a minimum, so that the costs, as well as the outer dimensions of the sensing attachment can be substantially reduced as compared to previous conventional types of embodiments. Due to the extensive mechanical independence, the position of installation may be adapted to optimum operating conditions, and the assembly made in a simple manner, without requiring any noteworthy adjusting operations.

The use of preparatory contacts for effecting the previous setting of transmitter distributors has already been practiced in separate types of tape transmitters, but this conventional type of embodiment, in which the power supply to the transmitting contacts is interrupted during the non-operative condition, is not applicable to sensing devices intended for the use in printing telegraph apparatus in which the transmitting equipment should be capable of being controlled in a mechanical way by either the keyboard or the answer-back unit.

This drawback is avoided by the tape sensing device according to the invention. The device is characterized by a number of switchover contacts corresponding to the number of sensing levers and capable of being actuated thereby, with the center springs of these switchover contacts being arranged in series with the corresponding transmitter contacts, and with the associated opposite springs thereof being applied to mark potential. The invention is further characterized by the fact that in the non-operative position the center springs, through the sensing levers, are each time in contact with the one opposite spring, from which position they, during the sensing process, in dependence upon the sensed code combination, are changed into the center position or into contact with the other opposite spring.

An example of the embodiment of this invention will be described in particular with reference to FIGS. 1-4 of the accompanying drawings, in which.

Figure 4:
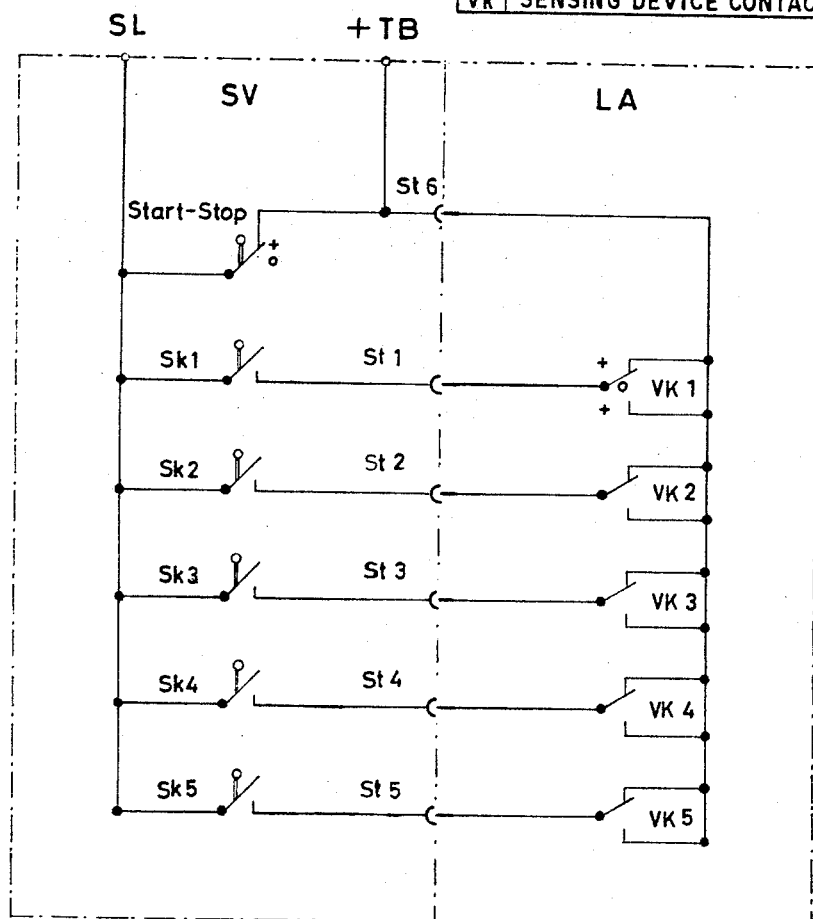

FIG. 3a to 3c show in a schematic representation the tape sensing device according to the invention in the three decisive operational stages and in each representation the illustration is limited to one sensing lever and corresponding sensing device contact, though, in fact, there exist one such lever and one such contact for each telegraphic code element; and FIG. 4 shows, with reference to a circuit diagram, the assignment of the individual contacts of the sensing device to the transmitting contacts.

Figure 1:
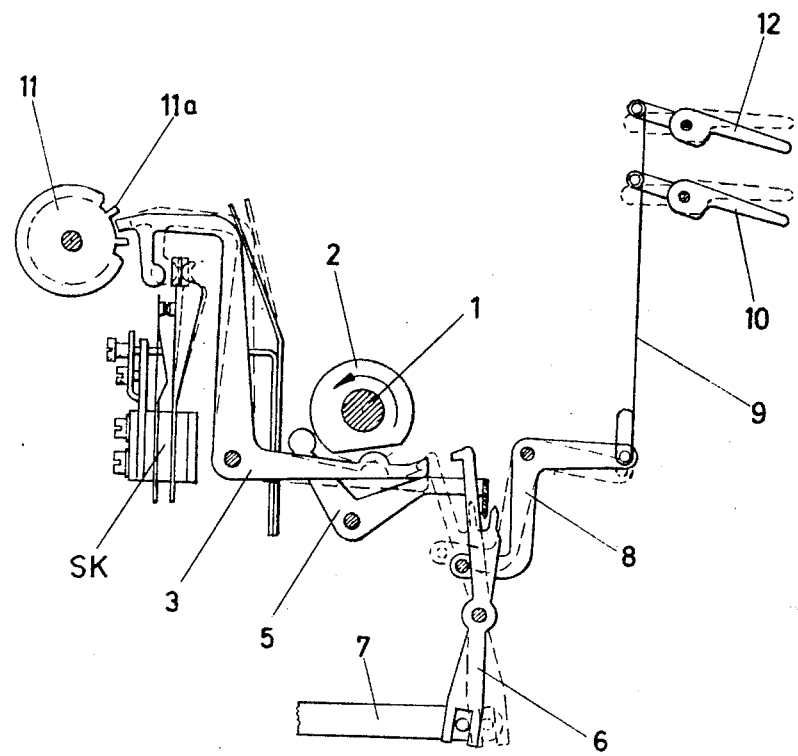
FIG. 1 shows in a schematic representation a multi-contact transmitter of a known type in which the transmitter is capable of being mechanically controlled by a keyboard and an answer-back unit.

The transmitting equipment as schematically shown in FIG. 1, is a so-called multi-contact transmitter of the type known, whose sensing levers 3 are successively released by the transmitting cam sleeve 2 during a transmitting process, in rhythm with the pulse succession. In the course of this the combination previously stored in mechanical elements is sensed in a mechanical way, and is transmitted to the transmitting contacts Sk.

Figure 2:
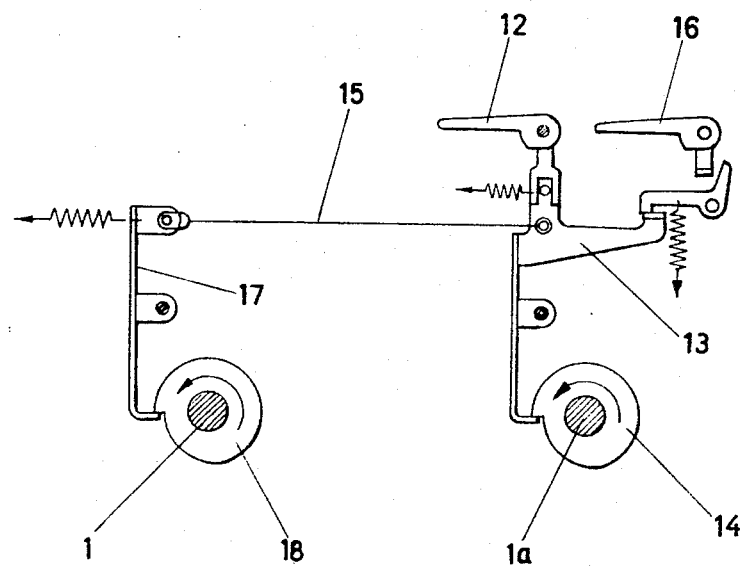
FIG. 2 shows in a schematical representation a releasing mechanism for synchronously switching on and off the cam sleeves of both the transmitter and the sensing device.

Since, in the case of a manual transmission, the sensing levers 3 perform the sensing of the stop levers 6 which are set by the selecting bars 7, with the stop levers 6 being retained during the transmission process in their selected position by the action of a cam-controlled stop ratchet 5, care is taken during the answer-back operation, upon actuation of the answer-back key 10, by a rodding 9 and a reset lever 8, that these stop elements 6 are moved into a position releasing the sensing levers 3, and are retained therein. During the time of the stepwise scanning of the answer-back drum 11, the transmitting cam sleeve 2, by being rigidly connected to the permanently rotating transmitter shaft 1, is released by the clutch 17, 18 schematically shown in FIG. 2.

In these two kinds of transmitting operations a "space"

element is effected in that the associated sensing lever 3, in the mechanical way, either by the action of the corresponding stop lever 6, or by the action of a sprocket of the answer-back drum 11a, is prevented from engaging. In this way not only the time duration of a pulse, but also its polarity is determined by the sensing levers 3. This, however, requires that each of the transmitting contacts Sk is on one side permanently applied to mark potential during the transmitting process.

When using a tape sensing device with preparatory contacts in connection with the transmitting equipment described herein, this demand can only be satisfied if the aforementioned condition is reestabilshed at the latest upon disconnection of the sensing device.

According to the invention this problem is solved in the most simple and most reliable way in that the preparatory contacts Vk1 through Vk5 according to FIGS. 3a to 3c and FIG. 4, are switchover contacts whose center springs 23a are arranged in series with the corresponding transmitting contacts Sk1 through Sk5, whereas the two opposing springs 23b and 23c are applied to mark potential (FIG. 4). By the action of a mechanical control which is still to be described herein, it is effected that the center springs 23a, in the non-operative condition, are always in contact with the opposite springs 23b (FIG. 3a) from where they, during the sensing cycle, and quite depending on whether or not the associated sensing lever 22 finds a perforation in the tape 25, will be moved into the opposite position against the other contact spring 23c (FIG. 3c), or are retained in the intermediate position in which they are in contact with none of the two springs (FIG. 3b).

The sensing device described herein is a device operated by a purely mechanical driving system. The shaft 1a of the sensing device is connected in a slipless manner to the transmitter shaft 1. Quite depending on the given conditions, this coupling can be made easily detachable by an intermediate gear system or a toothed belt drive.

On the shaft 1a of the sensing device there is pivoted a cam sleeve 19 by which the functions of the sensing device are being controlled. This cam sleeve is capable of being rigidly coupled to the shaft 1a of the sensing device by a clutch 13, 14 schematically shown in FIG. 2.

Upon actuating the tape transmitting key 12 (FIG. 1) there is effected on one hand the resetting of the stop elements 6 to the position releasing the sensing levers 3 by the same mechanism 8, 9 which is also capable of being actuated by the answer-back key 10. On the other hand, in accordance with FIG. 2, there is effected the synchronous release of both the transmitter clutch 17, 18 and the sensing device clutch 13, 14 through release members 17 and 13 by way of a synchronization mechanism 15 schematically shown in FIG. 2, in which the transmission elements between the sensing device and the transmitter act in a force-locking manner upon one another. For effecting the setting of the simultaneous release of both clutches, a regulating device is provided at the end of the sensing device.

The sensing mechanism itself consists, according to FIG. 3a, substantially of the already mentioned shaft 1a of the sensing device, on which the cam sleeve 19 is arranged rotatably. This cam sleeve includes a sensing cam 19a which, in the non-operative position of the cam sleeve 19, assumes the position as shown in FIG. 3a. A transmission bale 20 controlled by this cam 19a, is swivably supported on a shaft 21. On the same shaft 21 there is supported between the arms of the bale 20, a number of sensing levers 22 corresponding to the number of transmitting contacts Sk. Each of these levers 22 is provided with a boring 22a through which there projects a rod (bar) 18a resting in the arms of the bale 20. The borings 22a and the rod 18a have different diameters, and are in such a way arranged in relation to one another that in the non-operative condition, the sensing levers 22 are lifted off the tape 25 (FIG. 3a). The diameter ratio is chosen thus that the sensing levers 22 have a free play which, at the lower end of the sensing levers 22, is equal to the changing stroke of the switchover contacts Vk.

In the non-operative position of the sensing device as shown in FIG. 3a, all sensing contacts Vk are retained by the sensing levers 22 in the shown contact position, in which the center springs 23a are in contact with the opposite springs 23b, so that thus all transmitting contacts Sk are applied to the mark potential.

Activation of the tape transmitting key 12 (FIGS. 1 and 2) allows synchronous parallel release of the sensing device clutch 13, 14 in relation to the transmitter clutch 17, 18 as already described hereinbefore. Due to the synchronism of both the transmitter shaft 1 and the shaft 1a of the sensing device, also the respective cam sleeves rotate synchronously. During the transmission of the start pulse by the transmitting equipment, the transmission bale 20 following the cam track 19a, releases the sensing levers 22 which, under the effect of the contact springs 23a, perform a free swivel motion in the clockwise direction until they are prevented from performing a further movement either by the effect of the non-perforated tape 25 (FIG. 3b), or by the borings 22a meeting against rod 18a, then serving as a limit stop, during the sensing of a code hole. In this case the contacts Vk are so adjusted that the center spring 23a, in the case of FIG. 3b will assume a halfway or intermediate position between the two opposite springs 23b and 23c. In this way there is interrupted the circuit of the respective transmitting contact Sk which leads to the transmission of a space element. In the case of FIG. 3c, the center spring 23a of the respective contact Vk is released by the sensing lever 22, so that the latter is in contact with the other opposite spring 23c applied to mark potential. On account of this the circuit of the associated transmitting contact Sk which is only opened during the time of reversal of the contact, is reclosed, so that in this case a "mark" pulse will be transmitted.

The cam 19a is so designed that the sensing positions of the sensing levers 22, as described here, will be maintained until the last transmitting contact Sk has interrogated its associated preparatory contact Vk, with the transmitter as such only performing a sort of timing function. With the beginning of the stop element, the sensing levers 22 are returned, in the meantime by rotated cam 19a, into the non-operative position, whereas another, not shown, cam will effect the stepping on of the feed wheel 24 and, consequently, of the tape 25 by one step. This transmitting cycle is repeated in continuous succession moving the tape 25 by one step. This transmitting cycle is repeated in continuous succession until, by the response of a conventional type of tape sensing device, or by the actuation of the switch-off key 16 (FIG. 2), both the transmitting equipment and the sensing device are switched off.

FIG. 4, in the form of a circuit diagram, shows the electrical assignment of the sensing-device contacts Vk1 through Vk5 to the transmitting contacts Sk1 through Sk5. The transmitting contacts Sk1 through Sk5 which, together with the start-stop contact, are applied on one hand to the transmitting line SL, are with their other contact spring, by plug-in connections St1 through St5, in an electrical connection with the respective center springs of the preparatory contacts Vk1 through Vk5, whereas by the plug-in connection St6 the opposite springs of the preparatory contacts as applied to a common line, are connected to the positive pole of the subscriber battery TB.

Due to the plug-type establishment of the connection between the transmitter distributor SV and the tape sensing device LA requiring no further connecting elements besides the hardly problematic mechanical driving and release clutch, there is provided a sensing device which, by requiring the lowest expenditure, enables an easy mounting (installation) and safeguards a reliable operation.

While the principles of the invention have been described in connection with specific embodiments, and particular modifications thereof, it is to be clearly understood that this description is made only by way of example and not as a limitation of the scope of the invention.

We claim:

1. A tape sensing attachment for teleprinter apparatus with transmitting contacts and a transmitter drive shaft, comprising:

sensing device switching means having first spring contacts adapted to be coupled to corresponding ones of said teleprinter transmitter contacts, and second and third opposed contacts disposed on opposite sides of said first spring contact, said second and third contacts adapted to be coupled to a source of potential;

at least one sensing lever pivotally mounted on a shaft for rotational displacement from a first to a second of two positions representative of nonoperative and operative tape sensing modes, said lever having a first arm portion operatively associated with a corresponding one of said first spring contacts to control the position thereof relative to said second and third contacts, and a second arm portion for sensing indicia in a teleprinter tape; and a transmission bale pivotally mounted on said shaft for rotational displacement between said nonoperative and operative modes, said transmission bale having a rod mounted therein and projecting through a boring of said sensing lever, whereby the rotation of said sensing lever between said nonoperative and operative modes is caused rotational movement to like rotation of said bale.

2. A teleprinter tape sensing attachment according to claim 1 further including a sensing drive shaft and a sensing cam mounted thereon to control the rotational movement of said transmission bale between said nonoperative and operative tape sensing modes.

3. A teleprinter tape sensing attachment according to claim 2, further including a clutch means for controlling said sensing cam and actuation means for effecting synchronous operation with said transmitter drive shaft.

References Cited

UNITED STATES PATENTS 2,857,459  10/1958  Goetz.

THOMAS B. HABECKER, *Primary Examiner.*